(12) United States Patent
Nikitin et al.

(10) Patent No.: US 7,978,074 B2
(45) Date of Patent: Jul. 12, 2011

(54) METHOD AND APPARATUS FOR RFID TAG DETECTION AND CHARACTERIZATION

(75) Inventors: Pavel Nikitin, Seattle, WA (US); Venkata Kodukula, Bothell, WA (US); Rene Martinez, Seattle, WA (US); Harley Heinrich, Snohomish, WA (US)

(73) Assignee: Intermec IP Corp., Everett, WA (US)

( * ) Notice: Subject to any disclaimer, the term of this patent is extended or adjusted under 35 U.S.C. 154(b) by 654 days.

(21) Appl. No.: 12/099,051

(22) Filed: Apr. 7, 2008

(65) Prior Publication Data
US 2009/0251288 A1 Oct. 8, 2009

(51) Int. Cl.
*G08B 13/14* (2006.01)
(52) U.S. Cl. .................................. 340/572.1
(58) Field of Classification Search .... 340/572.1–572.9, 340/10.1; 343/700 R
See application file for complete search history.

(56) References Cited

U.S. PATENT DOCUMENTS

| | | | |
|---|---|---|---|
| 6,104,291 A | 8/2000 | Beauvillier et al. | |
| 6,784,789 B2 | 8/2004 | Eroglu et al. | |
| 7,154,283 B1 | 12/2006 | Weakley et al. | |
| 7,161,357 B2 | 1/2007 | Lee et al. | |
| 7,225,992 B2 | 6/2007 | Forster et al. | |
| 7,411,921 B2* | 8/2008 | Strong et al. | 370/328 |
| 7,518,516 B2* | 4/2009 | Azevedo et al. | 340/572.1 |
| 2007/0262866 A1* | 11/2007 | Eveland | 340/572.7 |
| 2007/0290807 A1* | 12/2007 | Smith et al. | 340/10.1 |

OTHER PUBLICATIONS

K.V. Seshagiri Rao, Pavel V. Nikitin, Sander F. Lam, "Antenna Design for UHF RFID Tags: A Review and a Practical Application," IEEE Transactions on Antennas and Propagation, Dec. 2005, vol. 53, No. 12.
David J. Puleston and Ian J. Forster, "The Test Pyramid: A Framework for Consistent Evaluation of RFID Tags from Design and Manufacture to End Use," Avery Dennison Press Release, Oct. 3, 2005.
Leonid Mats, James T. Cain, Marlin H. Mickle, "Analysis and Synthesis of RFID Equivalent Circuits through Backscatter and ARS," 2007 IEEE International Conference on RFID, Mar. 26-28, 2007.
Pavel V. Nikitin, K. V. S. Rao, "Measurement of Backscattering From RFID Tags," Proceediings of Antennas Measurement Techniques Association Symposium, Newport, Rhode Island, Oct. 2005.
P. V. Nikitin, K. V. S. Rao, "Theory and Measurement of Backscattering from RFID Tags," IEEE Antennas and Propagation Magazine, vol. 48, No. 6, pp. 212-218, Dec. 2006.

* cited by examiner

*Primary Examiner* — Phung Nguyen
(74) *Attorney, Agent, or Firm* — Perkins Coie LLP (57) ABSTRACT

This disclosure discloses methods and apparatus for detecting and characterizing radio-frequency identification (RFID) tags.

24 Claims, 13 Drawing Sheets

METHOD AND APPARATUS FOR RFID TAG DETECTION AND CHARACTERIZATION

TECHNICAL FIELD

The present disclosure is related to radio-frequency identification (RFID) tags. In particular, the present disclosure is related to methods and apparatuses for detecting and characterizing RFID tags.

BACKGROUND

RFID tags are commonly used for tracking inventory. For example, RFID tags can be individually associated with inventory items, and a reader can communicate with the RFID tags to track the inventory items. During operation, the reader requests information regarding the associated items (e.g., item descriptions, item tracking number, etc.) from the RFID tags. In response, the RFID tags provide the requested information to the reader. However, as the number of RFID tags in an environment increases, the reader may miss some RFID tags because of, e.g., interference between individual RFID tags and/or other factors. As a consequence, the tracked inventory may not be correct.

DETAILED DESCRIPTION

Described in detail below are embodiments of a RFID reading device and associated methods for detecting RFID tags in an environment. In one aspect, the RFID reading device is configured to illuminate the environment with a wideband signal and monitor a return loss reflected back from the environment. In another aspect, the RFID reading device is configured to analyze the return loss to determine whether any RFID tag is present in the environment. In a further aspect, the RFID reading device can also be configured to identify RFID tags in the environment based on, e.g., resonance frequencies of the RFID tags.

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Tag Detection Apparatus

Figure 1:
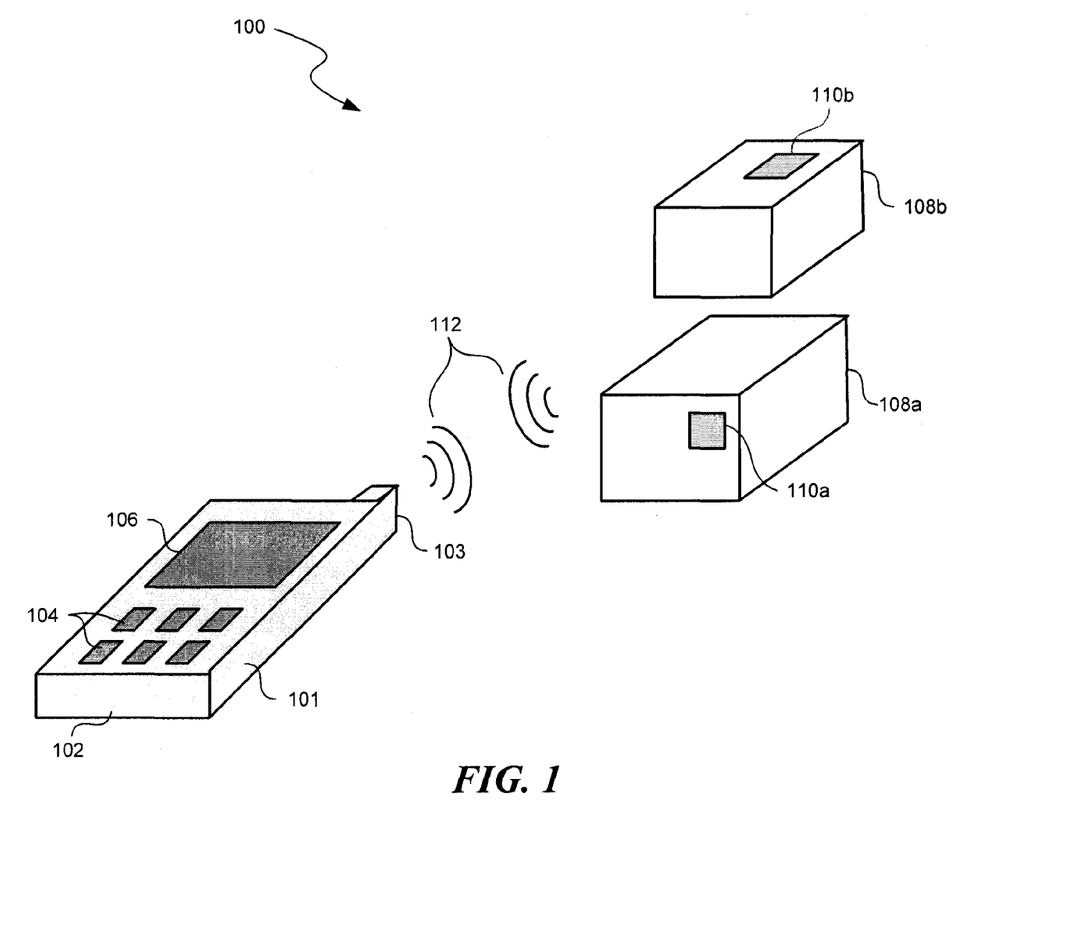
FIG. 1 is a schematic diagram illustrating a reader for detecting a missed RFID tag in accordance with an embodiment of the invention.

FIG. 1 is a schematic diagram illustrating a reader 102 for detecting a missed RFID tag in an environment 100 in accordance with an embodiment of the invention. As shown in FIG. 1, the environment 100 contains a first object 108a with a first attached RFID tag 110a and a second object 108b with a second attached RFID tag 110b. The environment 100 can be a room, a storage component, a vehicle, a conveyor belt, or other location holding or carrying the first and second objects 108a-b. The first and second objects 108a-b can include containers and/or other types of inventory item. The first and second tags 110a-b can include any type of RFID tags. In the following description, passive RFID tags are used as examples. However, in certain embodiments, the first and second tags 110a-b can also include an active or semi-passive RFID tag.

The reader 102 is positioned in the environment 100 to wirelessly communicate with the first and/or second tags 110a-b. As shown in FIG. 1, the reader 102 includes a housing 101 carrying multiple input devices 104 (e.g., push buttons), a display 106 (e.g., a liquid crystal display), and an antenna 103. The reader 102 also includes internal circuitry (not shown) that can produce a modulated signal and can transmit the modulated signal to the first and/or second tags 110a-b, as would be recognized by one skilled in the art. In response to the transmitted signal, the first and/or second tags 110a-b power up, modulate the received signal into a return signal, and transmit the modulated return signal carrying requested information to the reader 102. In certain embodiments, the reader 102 is configured as a handheld device. In other embodiments, the reader 102 can also be configured as a portable, stationary, and/or other type of device.

Figure 2:
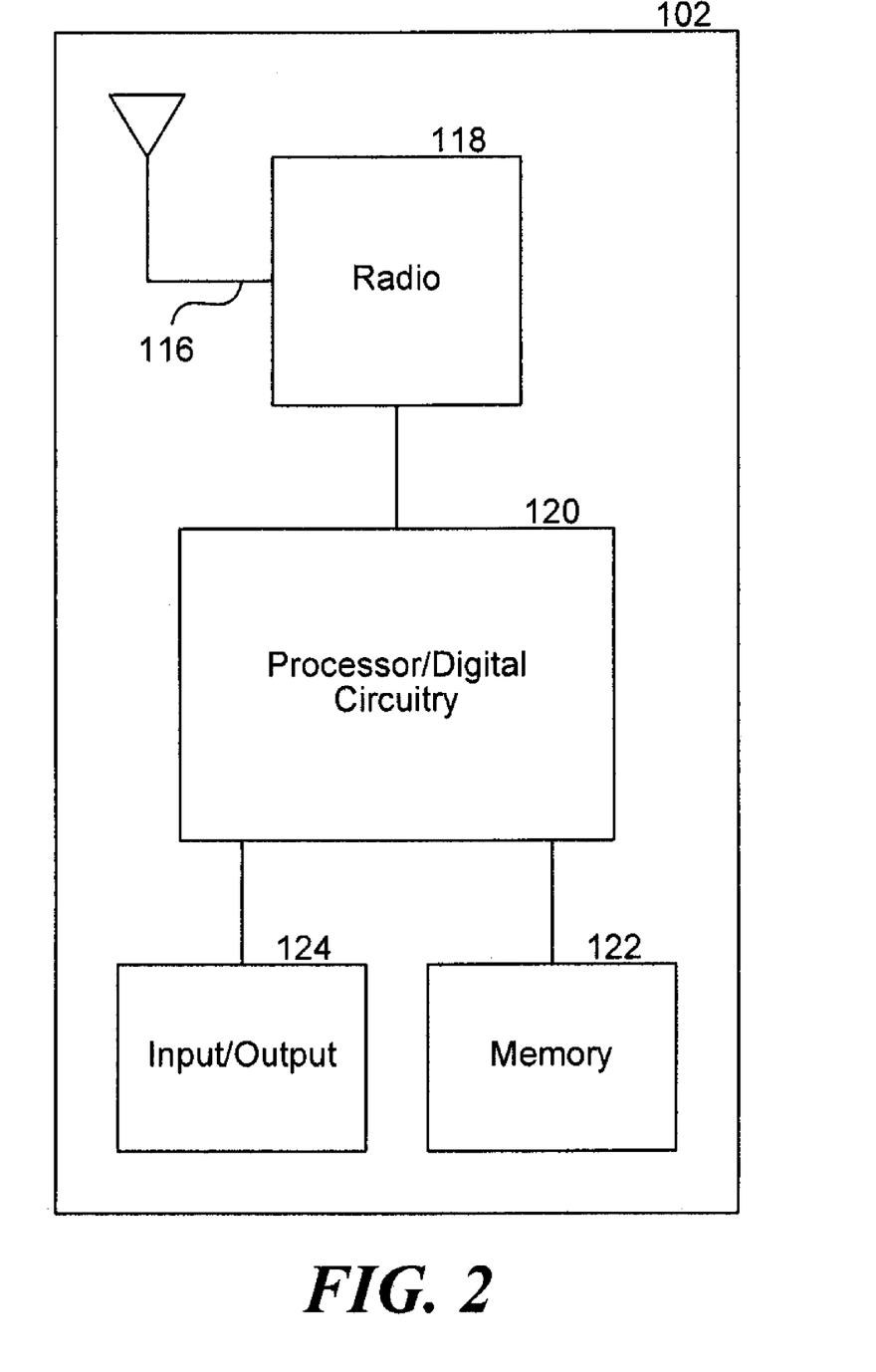
FIG. 2 is a functional block diagram illustrating logic components of the reader of FIG. 1 in accordance with an embodiment of the invention.

FIG. 2 is a functional block diagram illustrating logic components of the reader of FIG. 1 in accordance with an embodiment of the invention. As shown in FIG. 2, the reader 102 includes a radio 118 coupled to the antenna 103. A memory 122 of the reader 102 stores data received from tags as well as instructions for operating the reader 102. A processor 120 is operably coupled to the radio 118. The processor 120 is configured to communicate with the radio 118 to provide appropriate signals to and receive data from the radio 118. In certain embodiments, the processor/digital circuitry 120 may include a detector or a decoder with associated software or firmware to perform detection/decoding functions to process received signals. The reader 102 may also include circuitry for transmitting a wideband or ultra wideband signal and analyzing received return signals as described herein.

Referring to FIGS. 1 and 2 together, one operational difficulty of the above described arrangement is that sometimes the reader 102 does not recognize certain tags in the environment 100 because the tags do not provide any response or provide incorrect response to the reader 102. Many factors may cause the reader 102 to miss certain tags. For example, the modulated signal from the reader 102 may not adequately power up, e.g., the second tag 110b. As a result, the reader 102 may adequately query the first tag 110a via a wireless link 112 but may not query the second tag 110b because the second tag 110b would not respond or would respond incorrectly to the reader 102. In another example, the reader 102 may be operating at a frequency recognizable by the first tag 110a, but not the second tag 110b. Instead, the second tag 110b is designed to operate at a different frequency. As a result, the second tag 110b is likely not responsive to the reader 102. In yet another example, the first and/or second tags 110a-b may operate with different protocols unrecognizable to the reader 102. Other factors, such as environmental interference and tag interference, can also cause tags to incorrectly respond to queries from the reader 102. As a result, the reader 102 may miscount the number of objects in the environment 100.

To overcome the above described operational difficulty, the reader 102 can be configured to detect missed tags in accordance with several embodiments of the present invention. In certain embodiments, the radio 118 of the reader 102 is configured to generate and transmit a broadband or wideband signal or an ultra-wideband signal to illuminate the first and second tags 110a-b. The broadband or wideband signal can have a bandwidth of about 200 MHz, e.g., from about 800 MHz to about 1.0 GHz or other bandwidths different than 200 MHz, e.g., about 26 MHz in the 902-928 MHz industrial, scientific and medical (ISM) radio bands. In one embodiment, the broadband signal can be separate from the transmitted signal for querying the first and/or second tags 110a-b. In other embodiments, in addition to illuminating the first and second tags 110a-b, the broadband signal can be used to query the first and second tags 110a-b. For example, the broadband signal can power up the first and second tags 110a-b. In response to queries from the reader 102, the first and second tags 110a-b then modulate the broadband signal into a return signal and transmit the modulated return signal carrying requested information to the reader 102.

In response to the illuminating broadband signal, the first and second tags 110a-b then reflect a portion of the transmitted signal (commonly referred to as "backscattering") back to the antenna 103 of the reader 102. The radio 118 then passes the signal received at the antenna 103 to the processor 120. In addition to the functions and components discussed above, the processor 120 is also configured to receive and analyze the reflected signal to determine a return loss of the transmitted signal. Based on the determined return loss, the processor 120 can then determine the existence of the first and second tags 110a-b. In one embodiment, the processor 120 determines the existence of the first and second tags 110a-b by determining a resonance frequency of the reflected signal. In other embodiments, other characteristics of the reflected signal may be used.

Without being bound by theory, the inventors have recognized that a front end of an RFID tag (e.g., the first and second tags 110a-b) typically includes an antenna coupled to a complex impedance load of the RFID chip. When the wideband signal illuminates the first and second tags 110a-b, the power reflected from the loaded antenna of the first and second tags 110a-b is at its maximum when the load impedance is the complex conjugate of the antenna impedance. As a result, by determining at which frequency the reflected power exhibits its maximum, the processor 120 can detect and/or determine the presence of the first and second tags 110a-b even though these tags may not respond or respond incorrectly to queries from the reader 120.

Figure 3A:
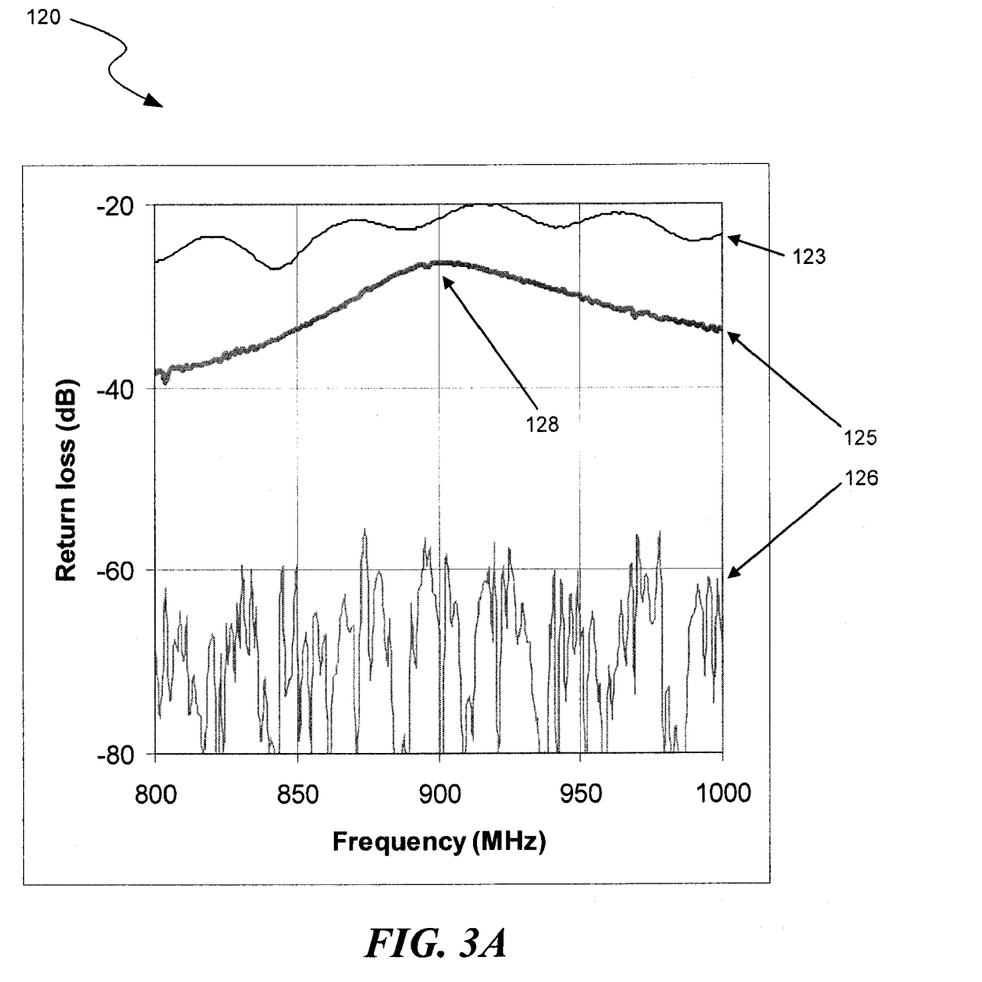
FIG. 3A is a return loss versus frequency diagram derived by the logic components of the reader in FIG. 1 in accordance with an embodiment of the invention.

The inventors have also recognized that the reflected signal typically includes substantial noise from, e.g., environmental interference and/or other factors. If such noise is not at least reduced or eliminated via calibration, the resonance frequencies of the first and second tags 110a-b may not be readily determined based on the reflected signal. FIG. 3A is an example of a return loss versus frequency diagram derived by the reader 102 in FIG. 1.

FIG. 3A illustrates a first profile 123 with environmental noise, a second profile 125 with at least reduced environmental noise and with a tag present, and a third profile 126 with at least reduced environmental noise and without a tag present. As can be seen in FIG. 3A, if the environmental noise is not at least reduced, the first profile 123 maintains substantially the same profile even when a tag is present and illuminated by the transmitted signal. However, after calibration to attenuate environmental noise, the second profile 125 shows a resonance frequency 128 at which the reflected power is at its maximum. The resonance frequency 128 can be calculated as a center frequency of a peak bandwidth (e.g., 3 dB). If no tag is present, the third profile 126 does not show a recognizable peak value, but instead includes generally random fluctuations. As a result, no resonance frequency may be recognized.

Figure 3B:
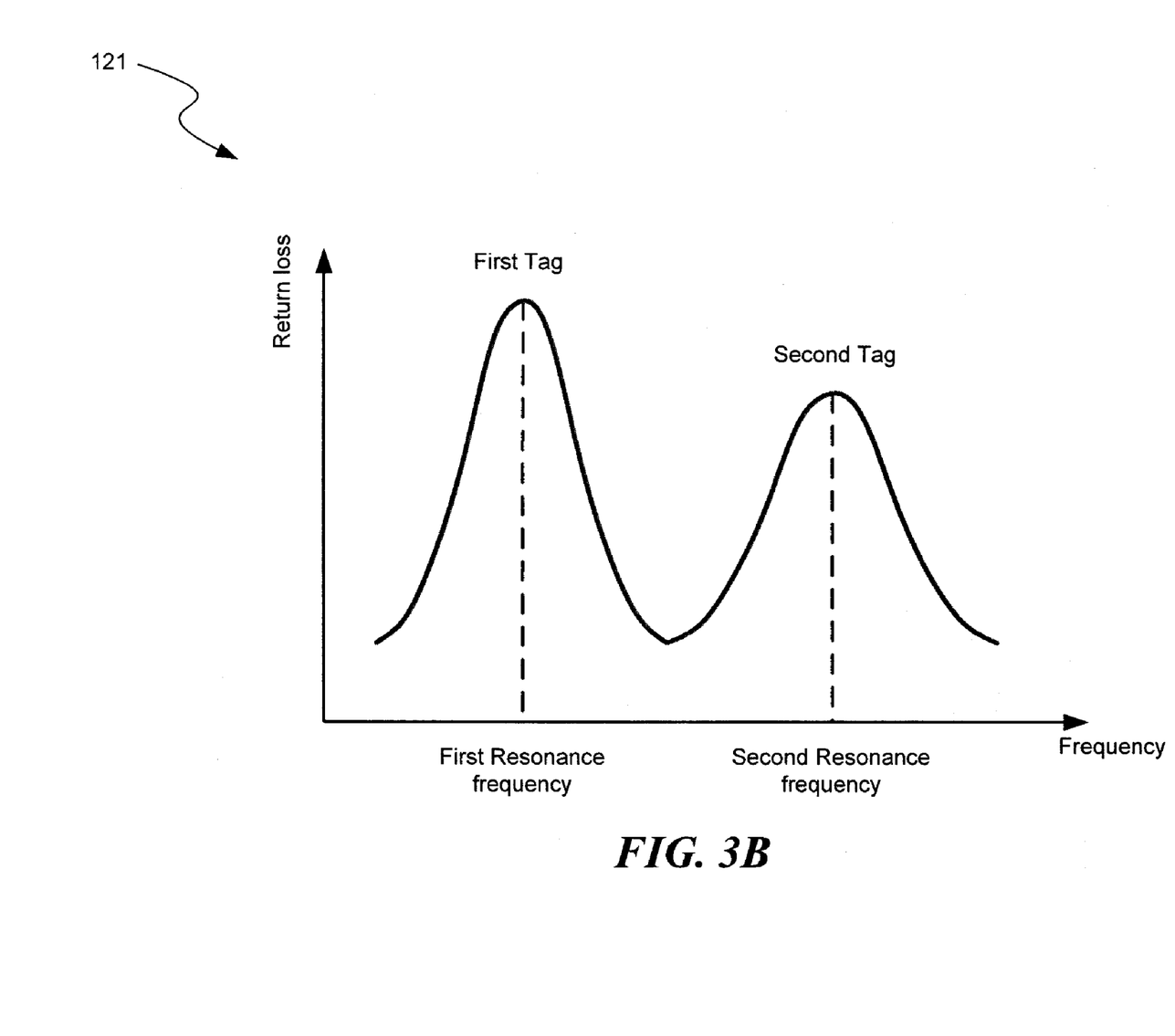
FIG. 3B is a return loss versus frequency diagram derived by the logic components of the reader in FIG. 1 in accordance with another embodiment of the invention.

FIG. 3B illustrates an example of return loss versus frequency diagram 121 derived by the logic components of the reader in FIG. 1. As shown in FIG. 3B, after calibration, the reader 102 can identify a first resonance frequency that corresponds to the first tag 110a and a second resonance frequency that corresponds to the second tag 110b. As a result, the reader 102 can determine the existence of the first and second tags 110a-b by determining the resonance frequencies based on the return loss.

Several embodiments of the reader 102 can improve the accuracy of scanning and tracking RFID tags. In addition to exchanging information with tags via communication protocols, several embodiments of the reader 102 can also scan and track tags based on the inherent characteristics (e.g., resonance frequencies) of the tags. As a result, even when certain tags do not respond or respond incorrectly to the reader 102 based on the communication protocol, the reader 102 can still detect the presence of the tags and/or recognize the tags based on stored tag characteristics.

Even though the first and second tags 110a-b are shown in FIG. 1 as being attached to the first and second objects 108a-b, in certain embodiments, the first and second tags 110a-b can also be implanted, inserted, or otherwise incorporated into the first and second objects 108a-b. Further, while the reader 102 is shown in FIGS. 1 and 2 as having a signal antenna 103, in other embodiments, the reader 102 can also include a plurality of antennas (not shown). For example, the reader 102 may transmit the wideband signal via a particular antenna and receive the reflected signal via a different antenna.

Tag Detection Method

Figure 4A:
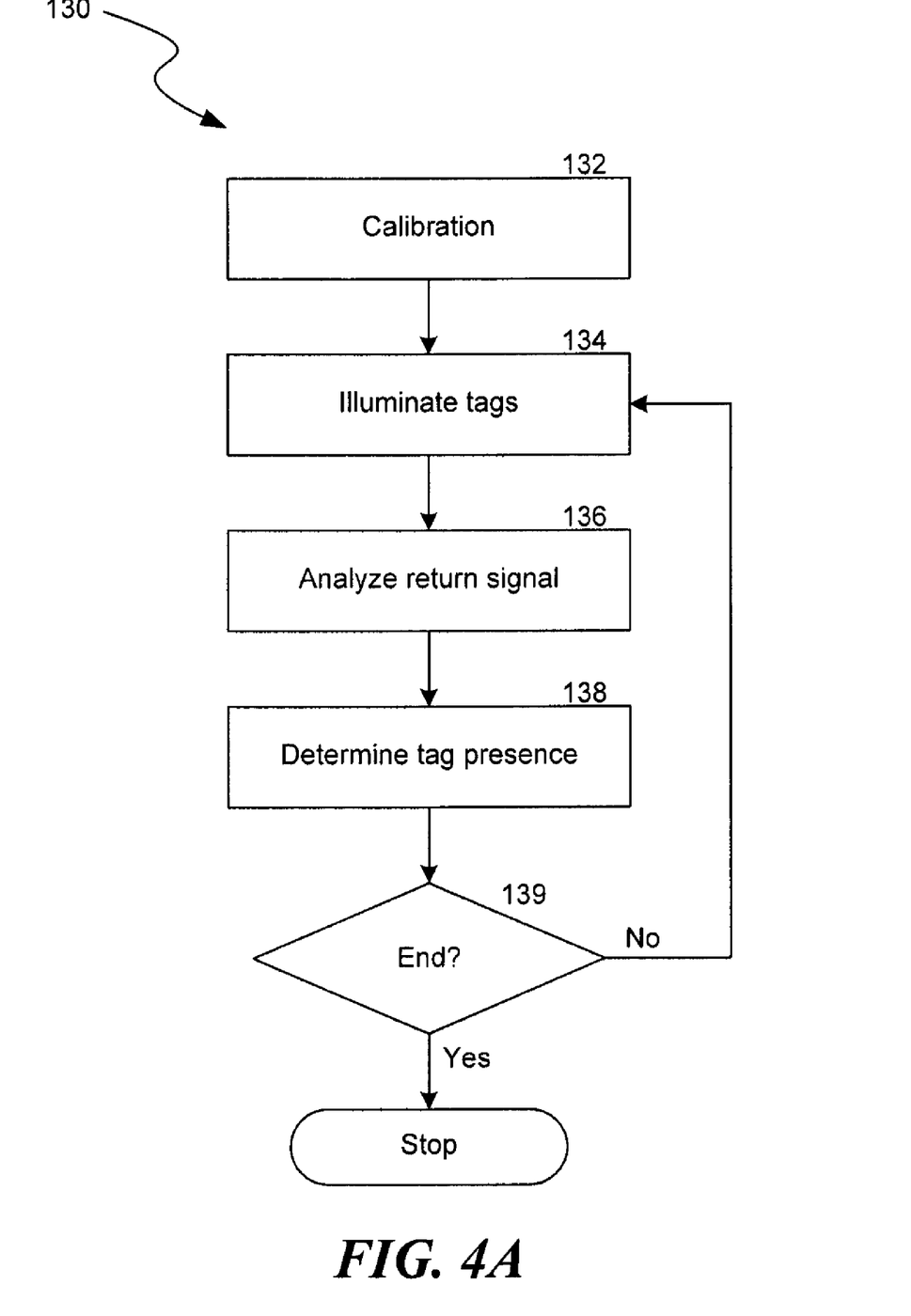
FIG. 4A is a flowchart illustrating a method of detecting a missed RFID tag in accordance with an embodiment of the invention.
Figure 4B:
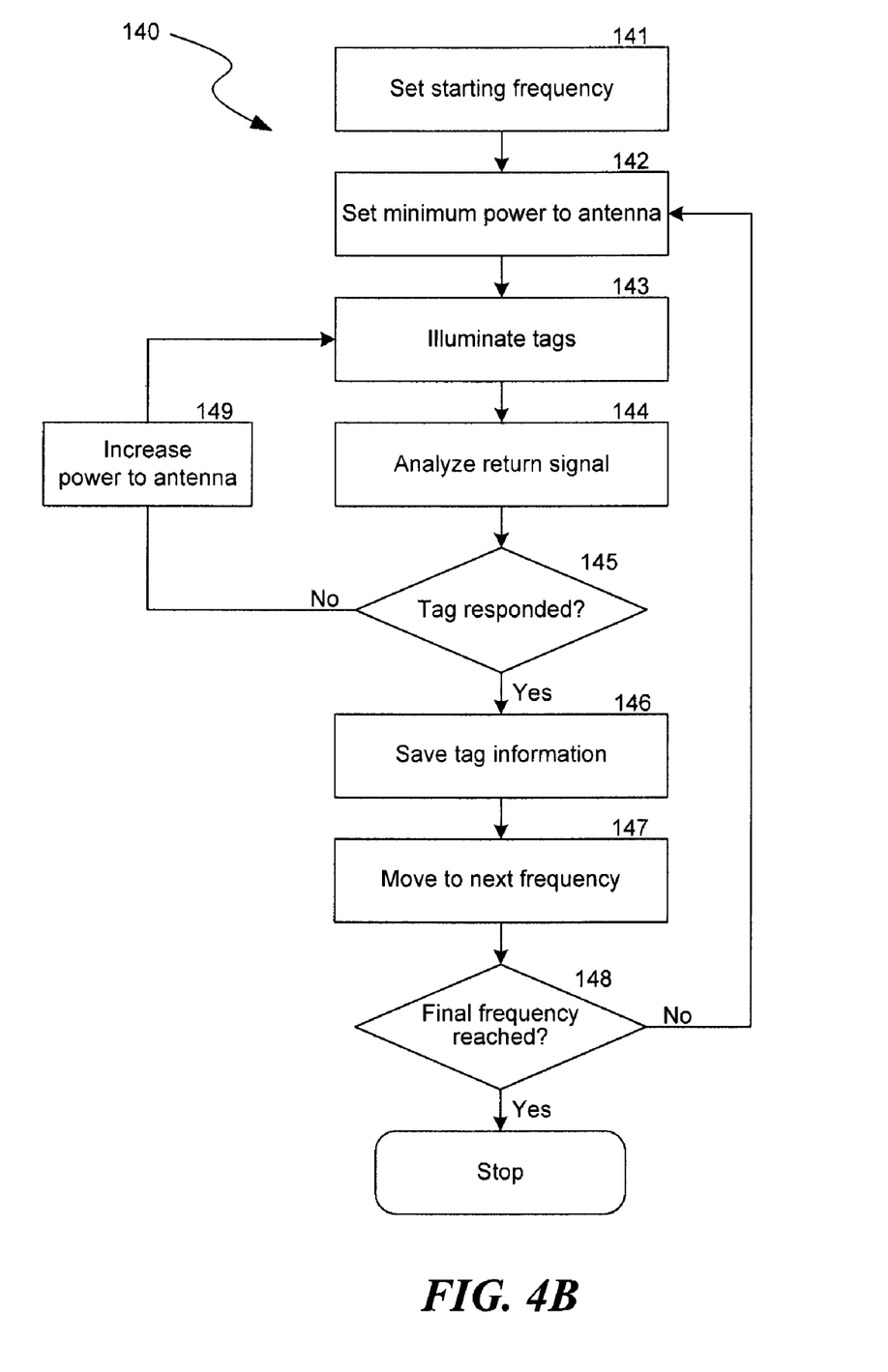
FIG. 4B is a flowchart illustrating a method of characterizing an RFID tag in accordance with another embodiment of the invention.

FIG. 4A is a flowchart illustrating a method 130 of detecting a missed RFID tag in accordance with an embodiment of the invention. FIG. 4B is a flowchart illustrating a method 140 of characterizing an RFID tag using RFID query signals in accordance with another embodiment of the invention. Even though the description below uses the environment 100 and the reader 102 in FIG. 1 as an example, the method 130 and method 140 may also be applied in other environments and/or with other devices.

Those skilled in the relevant art will appreciate that the invention can be practiced with any of various communications, data processing, or computer system devices, including: hand-held devices (including personal digital assistants (PDAs)), wearable computers, all manner of cellular or mobile phones, multi-processor systems, microprocessorbased or programmable consumer electronics, network PCs, mini-computers, mainframe computers, and the like. Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

An optional early stage 132 of the method 130 includes calibrating the reader 102 to at least reduce environmental noise. In certain embodiments, calibrating the reader 102 includes illuminating the environment 100 with a transmitted signal and measuring a return signal without a tag present. Without being bound by theory, it is believed that the measured return signal includes the effects of impedance mismatch, environmental reflections, and/or other interfering factors. The measured return signal is then set as a reference signal.

A subsequent stage 134 of the method 130 includes illuminating the environment 100 with the transmitted signal to help determine whether tags are present. The transmitted signal can be a wideband signal or an ultra-wideband signal. In one embodiment, the reader 102 can illuminate the environment 100 with the transmitted signal while the reader 102 queries tags and/or performs other functions. In another embodiment, the reader 102 can illuminate the environment 100 after all recognized tags are queried. In other embodiments, the reader 102 can illuminate the environment 100 periodically, e.g., between querying different tags.

Another stage 136 of the method 130 includes receiving a return signal based on the transmitted signal and analyzing the return signal to determine the presence and/or value of any resonance frequency. Analyzing the return signal includes first subtracting the reference signal from the return signal to derive a calibrated signal. In one embodiment, the resonance frequency, e.g., as a center of a peak bandwidth that may be over a threshold (e.g., 3 dB) can then be calculated based on the calibrated signal. In other embodiments, other techniques can be used to determine the presence and value of the resonance frequency.

A further stage 138 of the method 130 includes determining tag presence based on the recognized resonance frequency. In one embodiment, resonance frequencies of different tags may be predetermined and stored in the reader 102. As a result, based on the recognized resonance frequency from the previous stage, a list of recognized tags may be displayed to a user on the display 106. In other embodiments, the reader 102 may not have the resonance frequencies of the tags. However, the recognized resonance frequencies can be compared to the number of tags responding to queries from the reader 102. If the number of recognized resonance frequencies exceeds the number of tags responding to queries, a warning and/or other related information may be shown to the user on the display 106.

At stage 139, a decision is made regarding whether to continue the process. If all recognized tags have been processed or a command to terminate the process is received from the user, the process ends. If more tags require processing, the process reverts to stage 134.

Event though several embodiments of the method 130 of FIG. 4A include illuminating an environment with a wideband signal or an ultra-wideband signal, in other embodiments, RFID query signals at various frequencies and with varying power levels can also be used. FIG. 4B is a flowchart illustrating the method 140 of characterizing an RFID tag using RFID query signals in accordance with another embodiment of the invention.

Early stages 141, 142 of the method 140 can include setting a starting frequency for a RFID query signal and setting a minimum power to the antenna 103 at the starting frequency. Another stage 143 of the method 140 then includes illuminating the environment 100 with the RFID query signal and receiving a return signal from the environment 100. A subsequent stage 144 includes analyzing the return signal to determine, e.g., the presence and/or value of any resonance frequency of a tag in the environment 100, demodulating the return signal according to an RFID protocol, and/or performing other analysis. Then, a determination is made at stage 145 to decide whether the tag has responded to the query signal. The determination can be made, e.g., base on the demodulated return signal and/or other factors. If the tag has not responded, another stage 149 includes increasing the power to the antenna 103 and reverting to illuminating the environment 100 at stage 143. If the tag has responded, the process continues to another stage 146 in which tag information is saved. The tag information can include a resonance frequency of the tag based on the analyzed return signal, a frequency and/or a power level at which the tag responded, a tag ID, and/or other information associated with the tag. A subsequent stage 147 includes moving to a new frequency different than the starting frequency. The new frequency can be higher than or lower then the present frequency. A determination is then made at stage 148 to decide whether a final frequency (e.g., a maximum or a minimum frequency) has been reached. If yes, the process ends; otherwise, the process reverts to stage 142 in which a minimum power to the antenna 103 is set at the new frequency. The method 140 can optionally include constructing a tag resonance curve (e.g., similar to the curve 121 in FIG. 3B) based on the saved tag information.

EXAMPLES

Figure 5:
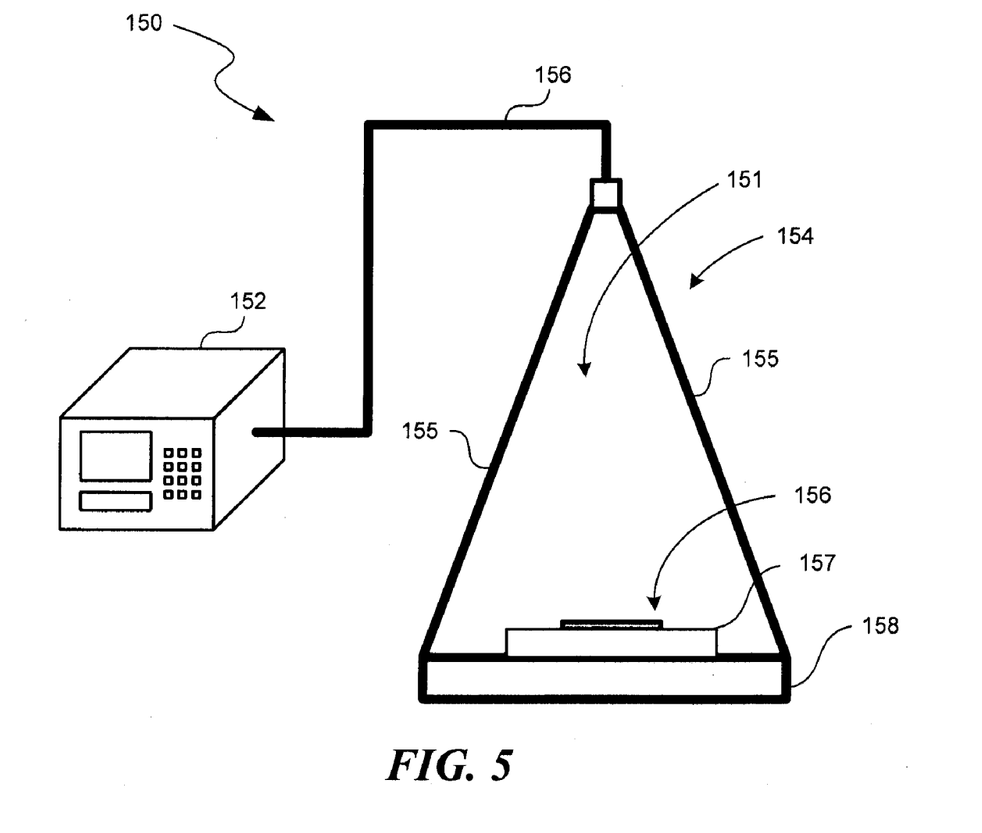
FIG. 5 is a schematic diagram of an experimental system for detection and characterization of RFID tags in accordance with embodiments of the invention.
Figure 6:
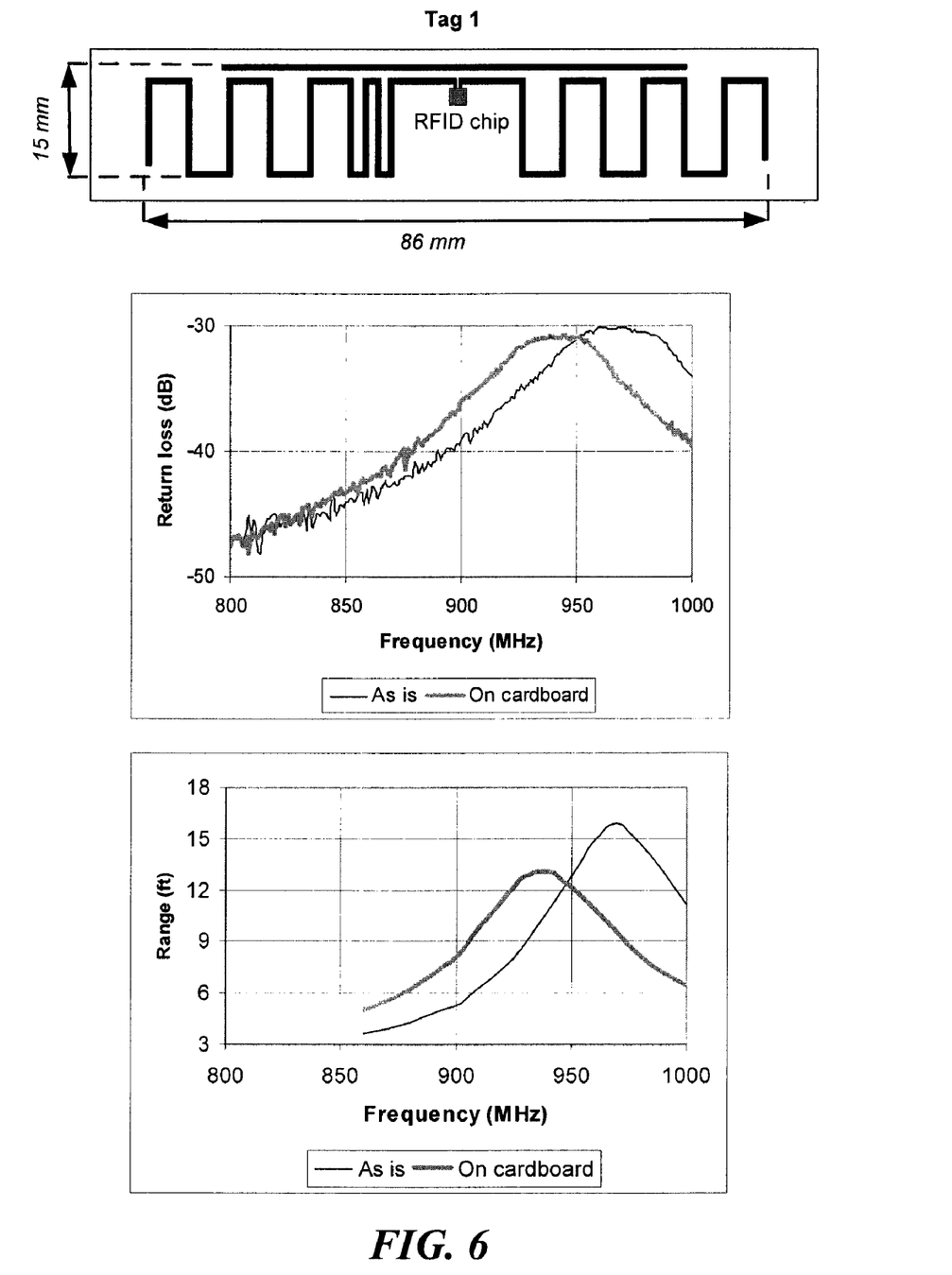
FIGS. 6-11 are diagrams of examples of RFID tags and sample return loss and range response plots in accordance with embodiments of the present invention.
Figure 7:
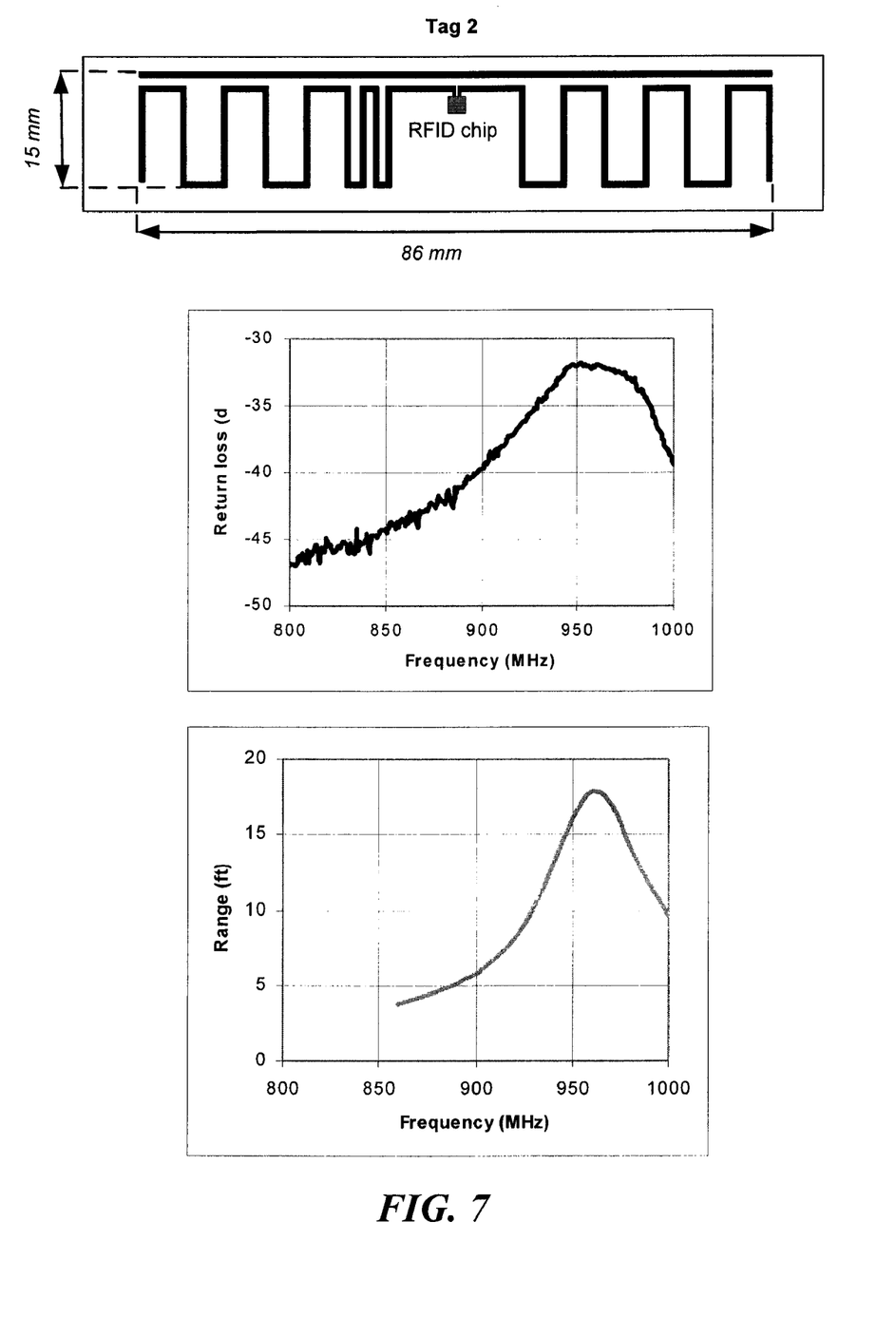
Figure 8:
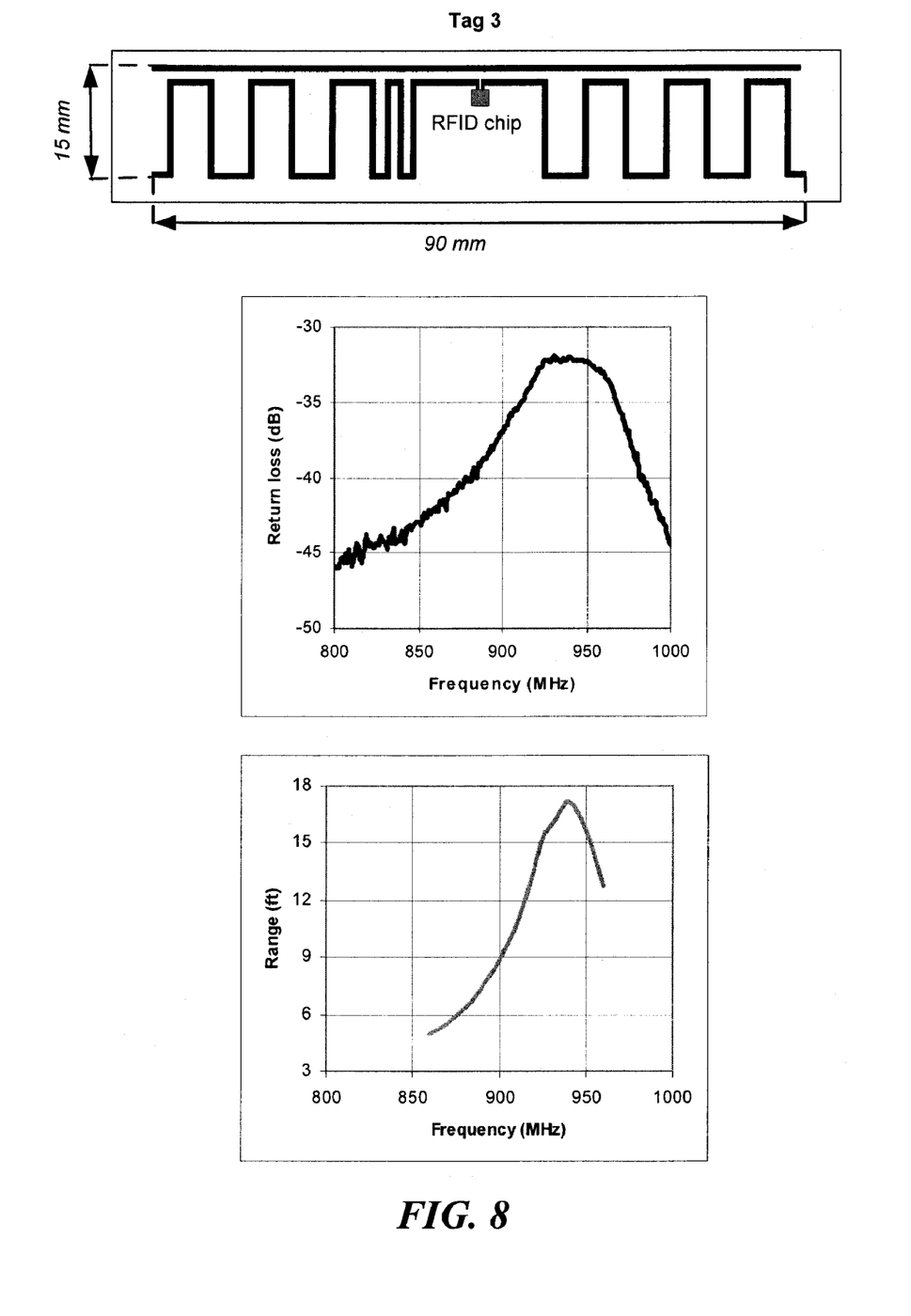
Figure 9:
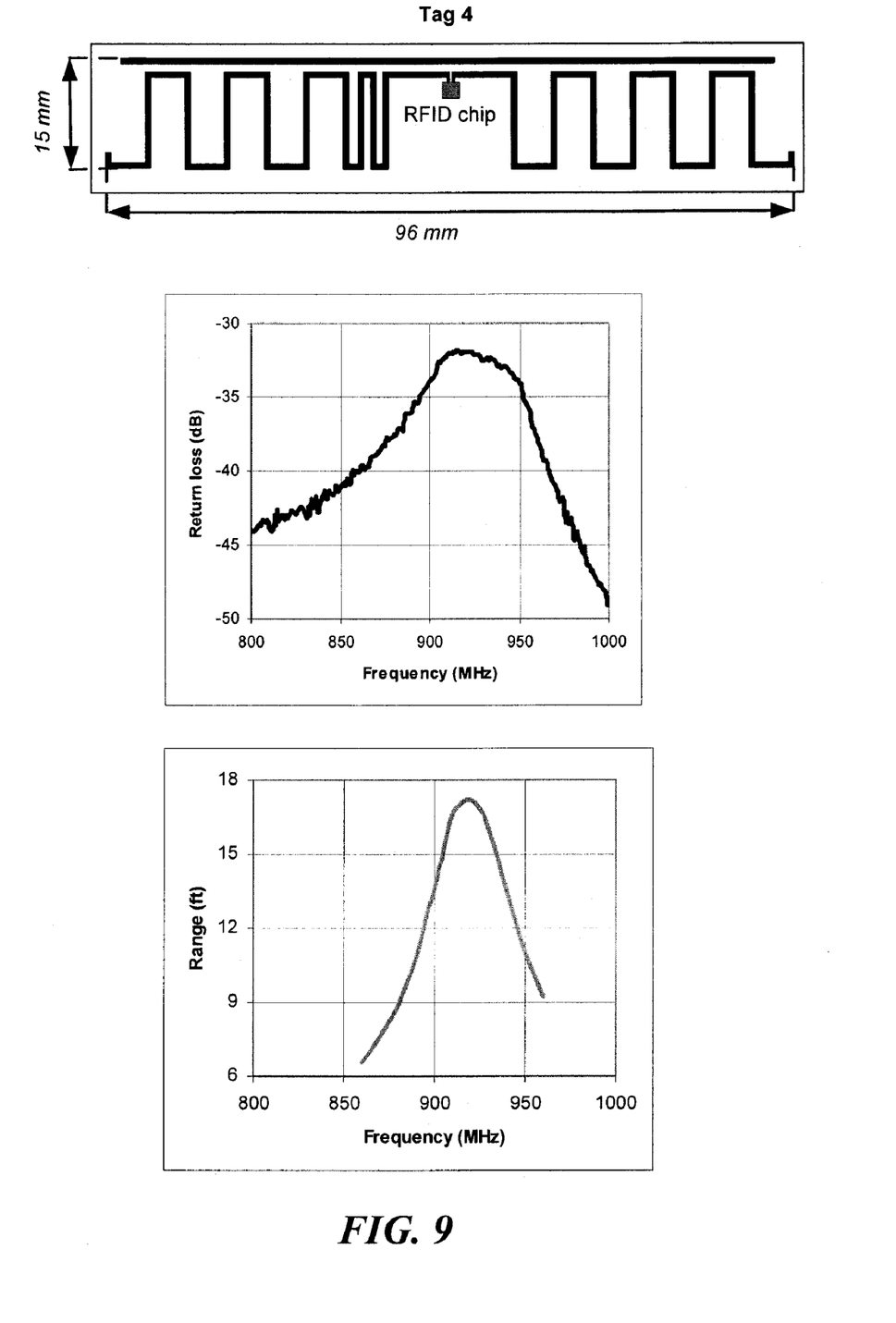
Figure 10:
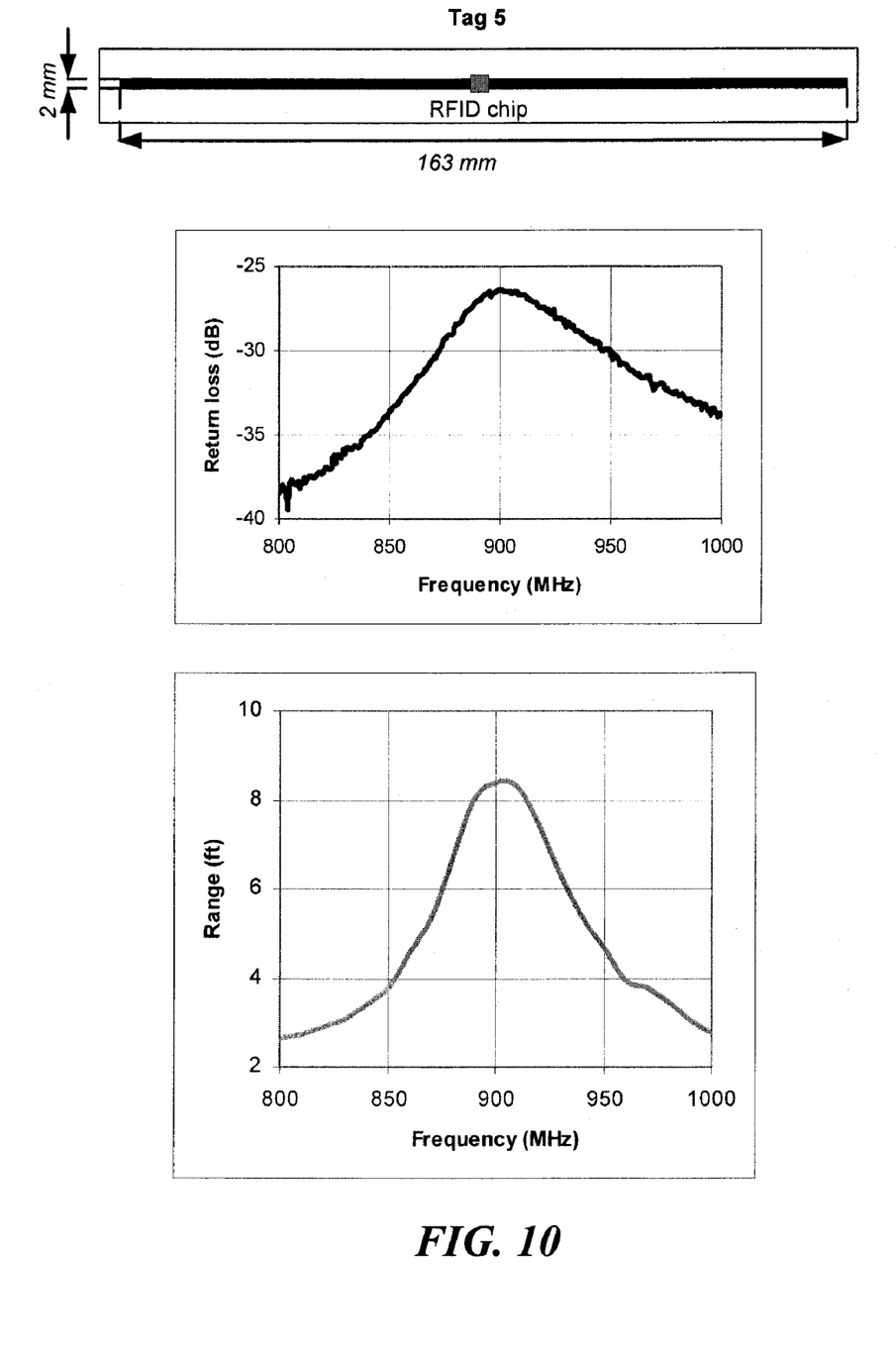
Figure 11:
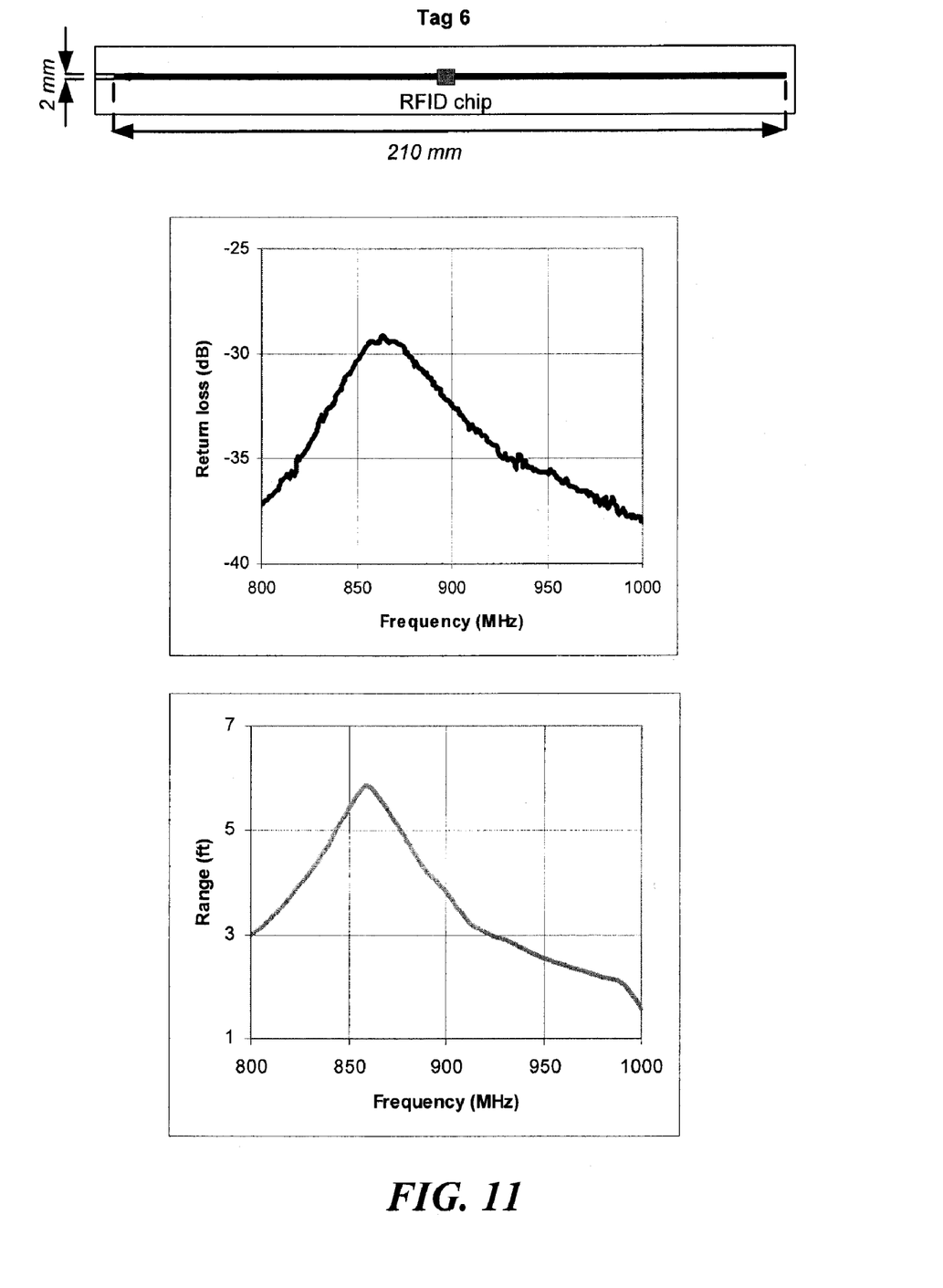

FIG. 5 is a schematic diagram of a system 150 for detecting and characterizing RFID tags in accordance with embodiments of the invention. As shown in FIG. 5, the system 150 includes a network analyzer 152 operably coupled to a transverse electromagnetic (TEM) cell 154 via a communication link 156. A suitable network analyzer 152 includes the network analyzer (Model No. HP8719C) provided by Agilent Technologies, Inc. of Santa Clara, Calif. The TEM cell 154 is configured to generate an electromagnetic field in a controlled environment. The TEM cell 154 can include a radio frequency bottom absorber 158 joining with sidewalls 155 to form an enclosed environment 151. The TEM cell 154 can also include a tag support 157 (e.g., a foam block) upon which a tag 156 can be carried. A suitable TEM cell 154 includes the UHF TEM cell (Model No. TC-5060A/B) provided by Tescom Industrial Controls & Systems Group of Elk River, Minn. Even though a TEM cell is used to establish an electromagnetic environment, in other embodiments, an anechoic chamber, a hollow conductive box, an antenna in air, and/or other devices may also be used.

Experiments were conducted using the system 150 of FIG. 5 to detect and characterize 6 sample tags (Tag 1-6). Before actual measurements, the system 150 was calibrated following the procedures outlined below:

1. With no tag inside the TEM cell 154, default factory calibration was recalled in 800-1000 MHz band;
2. The network analyzer 152 was used to measure the return loss, and the measurement was saved and subtracted from all subsequent measurements;
3. A tag with known resonance frequency was then placed inside the TEM cell 154 on the tag support 157;
4. The network analyzer 152 was used to measure the resonance frequency of the tag, and the thickness of the tag support 157 was adjusted until the return loss peak coincided with the known resonance frequency.

After calibration, the system 150 was used to characterize 6 RFID tags with various antennas (e.g., dipoles, menders, S-shapes, etc.), with various integrated circuitry (e.g., Phillips ISO, Impinj Gen2, etc.), with different resonance frequencies, and/or placed on various materials (e.g., cardboard, plastic, etc.). The table below summarizes the results of these experiments.

| Tag | Antenna type | Chip | Setting | Res. frequency measured by the broadband setup | Res. frequency measured by the proposed method |
|---|---|---|---|---|---|
| 1 | Meander | Philips (ISO) | As is | 970 MHz | 967 MHz |
|   | Meander | Philips (ISO) | On cardboard | 940 MHz | 940 MHz |
| 2 | Meander | Philips (ISO) | As is | 960 MHz | 959 MHz |
| 3 | Meander | Philips (ISO) | As is | 940 MHz | 939 MHz |
| 4 | Meander | Philips (ISO) | As is | 920 MHz | 923 MHz |
| 5 | Dipole | Impinj (Gen2) | As is | 900 MHz | 906 MHz |
| 6 | Dipole | Impinj (Gen2) | As is | 870 MHz | 868 MHz |

As can be seen from the above table, the measured resonance frequencies of the tags were in general agreement with those obtained using, e.g., a broadband RFID reader setup.

FIGS. 6-11 are diagrams showing results for each of the 6 measured example tags. Each one of FIGS. 6-11 includes a top portion showing the geometry of a tag; a middle portion showing a resonance frequency measured using the system 150; and a bottom portion showing a resonance frequency measured using the broadband ISO or Gen2 RFID reader setup.

The teachings of the invention provided herein can be applied to other systems, not necessarily the system described above. The elements and acts of the various embodiments described above can be combined to provide further embodiments.

While the above description describes certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While certain aspects of the invention are presented below in certain claim forms, the inventors contemplate the various aspects of the invention in any number of claim forms. For example, while only one aspect of the invention is recited as a means-plus-function claim under 35 U.S.C §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the inventors reserve the right to add additional claims after filing the application to pursue such additional claim forms for other aspects of the invention.

We claim:

1. A radio-frequency identification (RFID) tag reader, comprising:
    a radio configured to provide a first signal with a broad frequency bandwidth;
    an antenna coupled to the radio and configured to transmit the first signal to an environment and receive a second signal reflected back from the environment in the bandwidth of the first signal; and
    a processor configured to analyze the second signal to determine whether an RFID tag is present in the environment and to indicate that the RFID tag is present in the environment if a selected frequency is present;
    wherein the selected frequency corresponds to a resonant frequency of the RFID tag, and wherein the resonant frequency is within the bandwidth;
    and wherein the processor is configured to:
        determine a reference signal reflected from the environment without the RFID present; and
        subtract the monitored second signal from the reference signal to derive a calibrated signal.

2. The reader of claim 1 wherein the first signal has a bandwidth of about 200 MHz or less, and wherein the antenna includes a first antenna configured to transmit the first signal and a second antenna separate from the first antenna and configured to receive the second signal, a power of the first signal being adjustable, and wherein the processor is also configured to save the determined reference signal, and calculate a resonance frequency based on the calibrated signal, and wherein the processor is further configured to query the RFID tag using the first signal and following a communication protocol.

3. The reader of claim 1 wherein the reader is a handheld reader.

4. The reader of claim 1 wherein the processor is configured to determine whether the tag is a missed tag if the resonance frequency is present.

5. The reader of claim 1 wherein the processor is configured to:
if the resonance frequency is present, determine whether the RFID tag is responding to queries from the reader; and
if the RFID is not responding, indicate that the RFID is a missed tag.

6. The reader of claim 1 wherein the RFID tag is a first RFID tag and the frequency bandwidth is a first frequency bandwidth, and wherein the processor is also configured to query a second RFID tag at a second frequency bandwidth different from the first frequency bandwidth.

7. A radio-frequency identification (RFID) tag apparatus, comprising:
a radio configured to modulate a signal;
an antenna coupled to the radio and configured to illuminate an environment with the signal and detect a return loss of the signal from the environment; and
a processor configured to analyze the return loss and determine whether an RFID tag is present in the environment based on the analyzed return loss, wherein the processor is also configured to measure a reference signal from the environment without any RFID tag present, save the measured reference signal, and subtract the saved reference signal from at least one subsequent received signal to derive a calibrated return loss or received signal.

8. The apparatus of claim 7 wherein the antenna includes a first antenna configured to illuminate the environment with the signal and a second antenna separate from the first antenna and configured to detect a received signal indicative of the return loss.

9. The apparatus of claim 7 wherein the processor is configured to calculate a resonance frequency based on the calibrated return loss and configured to query the RFID tag using the signal and following a communication protocol.

10. The apparatus of claim 7 wherein the processor is configured to calculate a resonance frequency based on the calibrated return loss, and wherein the reader further includes a memory configured to store predetermined resonance frequencies of RFID tags.

11. The apparatus of claim 7 wherein the processor is configured to calculate a resonance frequency based on the calibrated return loss, and wherein the reader further includes a memory configured to store predetermined resonance frequencies of RFID tags, and wherein the processor is configured to compare the calculated resonance frequency to the stored resonance frequencies and identify the RFID tag.

12. The apparatus of claim 7 wherein the signal is a first signal, and wherein the radio is configured to modulate a second signal different from the first signal, and wherein the processor is configured to query the RFID tag using the second signal and following a communication protocol.

13. The apparatus of claim 7 wherein the signal is a first signal, and wherein the radio is configured to modulate a second signal different from the first signal, and wherein the processor is configured to query the RFID tag using the second signal and following a communication protocol, and wherein the first signal is at a first frequency band, and wherein the second signal is at a second frequency band different from the first frequency band.

14. A method for detecting a radio-frequency identification (RFID) tag in an environment, comprising:

directing a first signal with a frequency bandwidth to an environment;
monitoring a second signal reflected back from the environment in the bandwidth of the first signal;
determining a reference signal reflected from the environment without the RFID present;
subtracting the monitored second signal from the reference signal to derive a calibrated signal;
analyzing the calibrated signal to determine whether a resonance frequency of an RFID tag is present in the environment; and
if the resonance frequency is present, indicating the RFID tag is present in the environment; otherwise, indicating the RFID tag is not present in the environment.

15. The method of claim 14 wherein illuminating the environment with a first signal includes illuminating the environment with a first signal having a bandwidth of about 200 MHz or less, and wherein the method further comprises calibrating the environment by illuminating the environment with the first signal without the RFID present, measuring the reference signal reflected back from the environment and saving the measured reference signal, and further wherein subtracting the monitored second signal includes subtracting the saved reference signal from the second signal to derive the calibrated signal and wherein analyzing the calibrated signal includes calculating a resonance frequency based on the calibrated signal, and the method further comprises querying the RFID tag using the first signal and following a communication protocol.

16. The method of claim 14 wherein illuminating the environment with a first signal includes transmitting the first signal from a handheld reader to the environment.

17. The method of claim 16, further comprising if the resonance frequency is present, determining whether the RFID tag is a missed tag.

18. The method of claim 16, further comprising:
if the resonance frequency is present, determining whether the RFID tag is responding to queries from the handheld reader; and
if the RFID is not responding, indicating that the RFID is a missed tag.

19. The method of claim 16 wherein the RFID tag is a first RFID tag and the frequency bandwidth is a first frequency bandwidth, and wherein the method further includes querying a second RFID tag from the handheld reader at a second frequency bandwidth different from the first frequency bandwidth.

20. A radio-frequency identification (RFID) tag reader, comprising:
means for generating a signal;
means for transmitting the generated signal to an environment containing an RFID tag and monitoring a return signal from the environment; and
means for calculating a resonance frequency of the RFID tag and identifying the RFID tag based on the calculated resonance frequency; and
means for measuring a reference return signal from the environment without any RFID tag present, saving the measured reference return signal, and subtracting the saved return loss from subsequent return signals.

21. The reader of claim 20 wherein means for calculating the resonance frequency includes means for determining a center frequency in a predetermined bandwidth.

22. A radio-frequency identification (RFID) tag reader, comprising:
means for generating a signal;

means for transmitting the generated signal to an environment containing an RFID tag and monitoring a return signal from the environment;

means for calculating a resonance frequency of the RFID tag and identifying the RFID tag based on the calculated resonance frequency; and means for storing resonance frequency information for RFID tags, and wherein the means for calculating the resonance frequency also includes means for comparing the calculated resonance frequency to the stored resonance frequency information.

23. A radio-frequency identification (RFID) tag apparatus, comprising:

a radio configured to modulate a signal;

an antenna coupled to the radio and configured to illuminate an environment with the signal and detect a return loss of the signal from the environment; and a processor configured to analyze the return loss and determine whether an RFID tag is present in the environment based on the analyzed return loss;

and wherein the processor is also configured to calculate a resonance frequency based on a calibrated return loss and configured to query the RFID tag using the signal and following a communication protocol.

24. A method for detecting a radio-frequency identification (RFID) tag in an environment, comprising:

generating a signal;

transmitting the generated signal to an environment containing an RFID tag and monitoring a return signal from the environment;

calculating a resonance frequency of the RFID tag and identifying the RFID tag based on the calculated resonance frequency; and storing resonance frequency information for RFID tags, and wherein calculating the resonance frequency includes comparing the calculated resonance frequency to the stored resonance frequency information.

* * * * *